(12) United States Patent
Huang et al.

(10) Patent No.: US 12,021,571 B2
(45) Date of Patent: Jun. 25, 2024

(54) DIGITAL PRE-DISTORTION PROCESSING METHOD AND ELECTRONIC DEVICE

(71) Applicant: VIVO MOBILE COMMUNICATION CO., LTD., Dongguan (CN)

(72) Inventors: Peng Huang, Dongguan (CN); Runpeng Huang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 132 days.

(21) Appl. No.: 17/733,995

(22) Filed: Apr. 29, 2022

(65) Prior Publication Data

US 2022/0263589 A1  Aug. 18, 2022

Related U.S. Application Data

(63) Continuation of application No. PCT/CN2020/123777, filed on Oct. 26, 2020.

(30) Foreign Application Priority Data

Nov. 1, 2019 (CN) .......................... 201911060466.X

(51) Int. Cl.
*H04K 1/02* (2006.01)
*H04B 1/04* (2006.01)
(Continued)

(52) U.S. Cl.
CPC ............... *H04B 17/21* (2015.01); *H04B 1/04* (2013.01); *H04B 17/11* (2015.01); *H04B 2001/0425* (2013.01)

(58) Field of Classification Search
CPC .......... H04B 17/21; H04B 17/11; H04B 1/04; H04B 2001/0425; H01Q 11/12; H03F 3/195
(Continued)

(56) References Cited

U.S. PATENT DOCUMENTS 6,252,456 B1 * 6/2001 Baker .................... H01Q 11/12
330/207 P
9,054,759 B2 * 6/2015 Watanabe ............... H03F 3/195
(Continued)

FOREIGN PATENT DOCUMENTS

CN      101626355 A      1/2010
CN      101834677 A      9/2010
(Continued)

OTHER PUBLICATIONS

International Search Report issued in corresponding International Application No. PCT/CN2020/123777, dated Jan. 25, 2021, 4 pages.
(Continued)

*Primary Examiner* — Phuong Phu
(74) *Attorney, Agent, or Firm* — IPX PLLC

(57) ABSTRACT

A digital pre-distortion processing method and an electronic device are provided. The method is performed by an electronic device and includes: detecting a standing wave status of an antenna of the electronic device; obtaining a calibration result through digital pre-distortion calibration in a case that the standing wave status satisfies a preset working condition; and determining whether to enable a digital pre-distortion function according to the calibration result.

12 Claims, 4 Drawing Sheets

(51) Int. Cl.
   *H04B 17/11* (2015.01)
   *H04B 17/21* (2015.01)
   *H04L 25/03* (2006.01)
   *H04L 25/49* (2006.01)

(58) Field of Classification Search
   USPC .................................... 375/296, 297, 285
   See application file for complete search history.

(56) References Cited

U.S. PATENT DOCUMENTS

2012/0063495 A1  3/2012  Behzad
2016/0322992 A1  11/2016 Okawa et al.

FOREIGN PATENT DOCUMENTS

CN   104580043 A   4/2015
CN   108738122 A   11/2018

OTHER PUBLICATIONS

First Office Action issued in related Chinese Application No. 201911060466.X, dated Feb. 26, 2021, 6 pages.
Extended European Search Report issued in related European Application No. 20881467.3, dated Nov. 22, 2022, 7 pages.

* cited by examiner

DIGITAL PRE-DISTORTION PROCESSING METHOD AND ELECTRONIC DEVICE

CROSS-REFERENCE TO RELATED APPLICATIONS

This application is a continuation of International Application No. PCT/CN2020/123777, filed on Oct. 26, 2020, which claims priority to Chinese Patent Application No. 201911060466.X, filed on Nov. 1, 2019. The entire contents of each of the above-identified applications are expressly incorporated herein by reference.

TECHNICAL FIELD

Embodiments of the present disclosure relate to the field of terminal technologies, and in particular, to a Digital Pre-Distortion (DPD) processing method and an electronic device.

BACKGROUND

To improve the linearity of a radio frequency Power Amplifier (PA), the linearization technology is usually used. At present, the linearization technology is mainly implemented through the DPD technology. The DPD technology can improve the linearity of a PA, optimize radio frequency performance, and reduce radio frequency power consumption.

A feedback mechanism needs to be introduced in the DPD technology, that is, output signals of the PA are sampled to correct a DPD coefficient. However, when an antenna is close to a face or is held by a user, the performance of the antenna deteriorates, resulting in distortion of sampled signals and low DPD calibration accuracy. As a result, this causes a series of problems such as increase of radio frequency power consumption. However, the related art has no corresponding solution to the problem of low DPD calibration accuracy.

SUMMARY

Embodiments of the present disclosure provide a digital pre-distortion processing method and an electronic device.

To resolve the foregoing technical problem, the embodiments of the present disclosure are implemented as follows:

According to a first aspect, a digital pre-distortion processing method is provided, applied to an electronic device, including:
  detecting a standing wave status of an antenna of the electronic device;
  obtaining a calibration result through digital pre-distortion calibration in a case that the standing wave status satisfies a preset working condition; and
  determining whether to enable a digital pre-distortion function according to the calibration result.

According to a second aspect, an electronic device is provided, including:
  a standing wave status detection module, configured to detect a standing wave status of an antenna of the electronic device;
  a pre-distortion module, configured to: obtain a calibration result through digital pre-distortion calibration in a case that the standing wave status satisfies a preset working condition; where the pre-distortion module is further configured to determine whether to enable a digital pre-distortion function according to the calibration result.

According to a third aspect, an electronic device is provided, including: a processor, a memory, and a computer program stored in the memory and executable on the processor. When the computer program is executed by the processor, steps in the method provided in the first aspect are implemented.

According to a fourth aspect, a computer-readable storage medium is provided, storing a computer program. When the computer program is executed by a processor, steps in the method provided in the first aspect are implemented.

According to a fifth aspect, a computer program product is provided, stored in a nonvolatile storage medium. The program product is configured to be executed by at least one processor to implement steps of the method provided in the first aspect.

According to a sixth aspect, a chip is provided, including a processor and a communication interface. The communication interface is coupled to the processor, and the processor is configured to run a program or an instruction to implement steps of the method provided in the first aspect.

According to a seventh aspect, a digital pre-distortion processing apparatus is provided, configured to perform steps of the method provided in the first aspect.

In the embodiments of the present disclosure, the standing wave status of the antenna is detected, in the case that the standing wave status satisfies the preset working condition, the calibration result is obtained through digital pre-distortion calibration, and whether to enable the digital pre-distortion function is determined according to the calibration result. The embodiments of the present disclosure can avoid the problem of low DPD calibration accuracy caused because DPD calibration is performed when an antenna standing wave is poor, to improve the DPD calibration accuracy and reduce the distortion of the PA.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings.

The accompanying drawings described herein are used to provide further understanding of the present disclosure and constitute a part of the present disclosure. The illustrative embodiments of the present disclosure and descriptions thereof are used to explain the present disclosure, and do not constitute any improper limitation on the present disclosure. In the accompanying drawings.

DETAILED DESCRIPTION

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
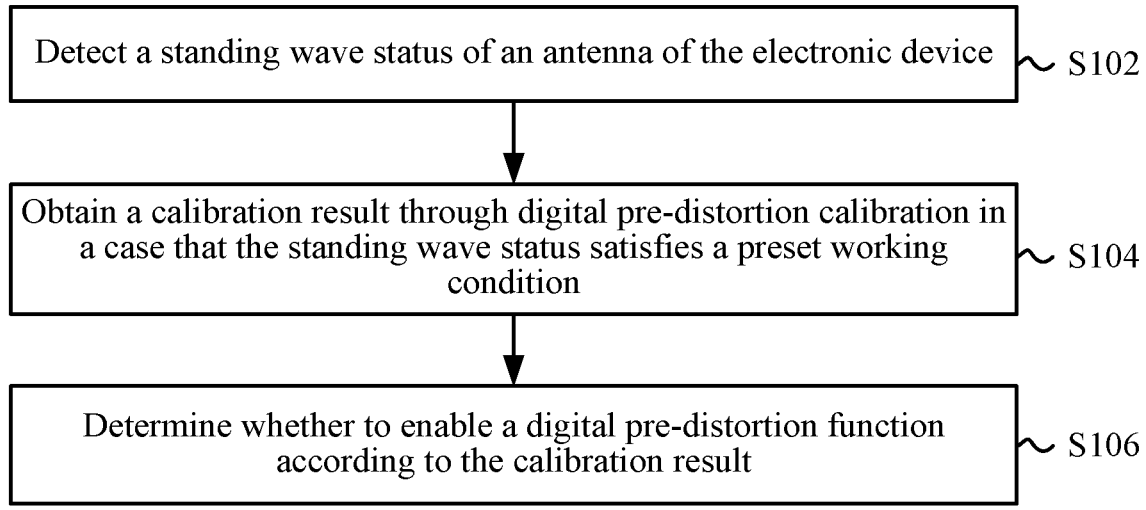
FIG. 1 is a schematic flowchart of a digital pre-distortion processing method according to an embodiment of the present disclosure.

As shown in FIG. 1, an embodiment of the present disclosure provides a digital pre-distortion processing method 100. The method may be applied to an electronic device, and includes the following steps.

S102: Detect a standing wave status of an antenna of the electronic device.

The antenna in the embodiments of the present disclosure not only may be a Wi-Fi antenna, but also may be an antenna used in mobile network standards such as Long Term Evolution (LTE) or New Radio (NR). The Wi-Fi antenna is used as an example below.

Figure 2:
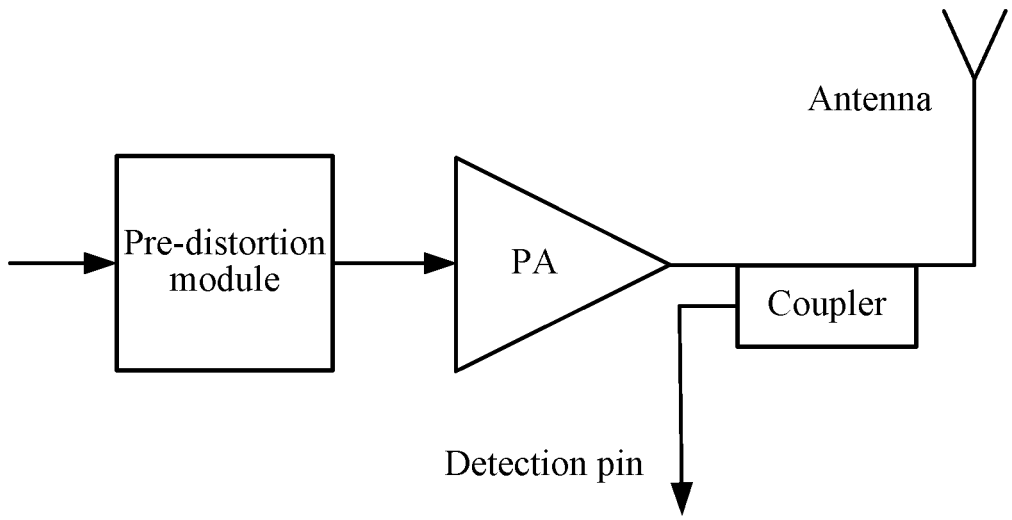
FIG. 2 is a schematic diagram of a hardware environment of a digital pre-distortion processing method according to an embodiment of the present disclosure.

The detection of the standing wave status of the antenna of the electronic device in this step may specifically be: detection of an offset between a feedback power of a Power Amplifier (PA) and a feedback power of the antenna. A specific detection principle is shown in FIG. 2 below. In FIG. 2, an output end of a pre-distortion module is connected to an input end of the PA, and an output end of the PA is connected to the antenna.

The pre-distortion module can be configured to correct a DPD coefficient according to a power of an input sampling signal and a power of a feedback sampling signal (hereinafter abbreviated as a feedback power). The input sampling signal is a signal inputted to the pre-distortion module, and the feedback sampling signal is determined according to an output signal of the PA, for example, can be detected by a detection pin of a coupler. When the standing wave status of the antenna changes, the feedback power of the detection pin changes. Therefore, in this embodiment, the standing wave status of the antenna can be detected by detecting the feedback power of the detection pin.

In a preferred embodiment, the coupler shown in FIG. 2 is a coupler used in a DPD system, and a feedback power detected by the coupler can also be used to correct a DPD coefficient in subsequent steps. In this embodiment, no additional hardware costs are added to the electronic device. This helps to save resources and reduce the volume of the electronic device.

This embodiment of the present disclosure shows a specific implementation manner of step S102. Certainly, it should be understood that step S102 can also be implemented in other manners, for example, a distance/light/image sensor detects whether the antenna is held by a user, or detects whether a face approaches the antenna, to determine the standing wave status of the antenna. This is not limited in this embodiment of the present disclosure.

S104: In a case that the standing wave status of the antenna satisfies a preset working condition, obtain a calibration result through digital pre-distortion calibration.

In this step, if the standing wave status of the antenna satisfies the preset working condition, it indicates that the standing wave status of the antenna is normal. Specifically, a standing wave ratio of the antenna may be less than a threshold.

In some embodiments, the detection of the standing wave status of the antenna of the electronic device in step S102 is: detection of the offset between the feedback power of the PA and the feedback power of the antenna. In this case, that the standing wave status of the antenna in this step satisfies the preset working conditions includes: the offset between the feedback powers is less than or equal to a preset threshold, that is, a difference (absolute value) between a detected feedback power and a preset feedback power is less than or equal to the preset threshold.

In this embodiment, if the standing wave status of the antenna does not satisfy the preset working condition, for example, the offset between the feedback powers is greater than the preset threshold, that is, a standing wave difference of the antenna, the antenna may be close to a face or may be held by a user with a hand. In this embodiment, DPD calibration can be stopped, to avoid DPD calibration when antenna performance is poor and avoid low DPD calibration accuracy. Certainly, in this embodiment, when DPD calibration is stopped, a DPD function of the electronic device can also be stopped, that is, the pre-distortion module no longer performs DPD processing on an input signal.

In this step, DPD calibration is performed, and the obtained calibration result may specifically be: the calibration succeeds or the calibration fails.

Specifically, in this step, DPD calibration may be performed to obtain a DPD coefficient. If the distortion of the PA is within an acceptable range after the pre-distortion module uses the obtained DPD coefficient to enable the DPD function, it is determined that the DPD calibration succeeds. Otherwise, if the distortion of the PA is not within the acceptable range after the pre-distortion module uses the obtained DPD coefficient to enable the DPD function, it is determined that the DPD calibration fails, and the DPD calibration can be performed again later.

The DPD coefficient can be calculated based on the following models and estimation algorithms: Models include, for example, a memory polynomial model, a Wiener model, a Hammerstein model, or a Volterra model. Estimation algorithms include, for example, the least square method, the least mean square algorithm, or the recursive least square method. The DPD coefficient is used to instruct the pre-distortion module to perform DPD processing on an input signal to obtain a required pre-distorted output signal and input the output signal to the PA, thereby optimizing the linearity of the PA.

S106: Determine whether to enable a digital pre-distortion function according to the calibration result.

As mentioned above, the calibration result includes: the calibration succeeds or the calibration fails. If the digital pre-distortion calibration succeeds, the digital pre-distortion function is enabled. If the digital pre-distortion calibration fails, step S104 of performing digital pre-distortion calibration is performed again.

In the DPD processing method provided in the embodiments of the present disclosure, the electronic device can detect the standing wave status of the antenna at regular intervals. If the standing wave status meets the preset working condition, that is, when the standing wave of the antenna is normal, the DPD calibration is performed immediately.

In the embodiments of the present disclosure, in the process of DPD calibration, a feedback signal fed back by the detection pin of the coupler is captured, the distortion of the PA is analyzed in digital domain, and then a signal inputted to the PA is adjusted (that is, pre-distorted), to reduce the physical distortion of the PA to an acceptable level. If the calibration succeeds (that is, the distortion is at an acceptable level), the digital pre-distortion function is enabled; otherwise, DPD calibration is performed again.

In the DPD processing method provided in the embodiments of the present disclosure, the standing wave status of the antenna is detected, the calibration result is obtained through digital pre-distortion calibration when the standing wave status satisfies the preset working condition, and whether to enable the digital pre-distortion function is determined according to the calibration result.

The embodiments of the present disclosure can avoid the problem of low DPD calibration accuracy caused because DPD calibration is performed when the standing wave of the antenna is poor, to improve the DPD calibration accuracy, reduce the distortion of the PA, improve the radio frequency performance, and facilitate the optimization of an Error Vector Magnitude (EVM) and an Adjacent Channel Power Ratio (ACPR) of the PA.

In addition, the embodiments of the present disclosure may be implemented at preset time intervals, that is, DPD calibration is performed at preset time intervals. Compared with DPD calibration performed only when the PA is started, DPD calibration accuracy can be further improved.

The improvement of the DPD calibration accuracy in the embodiments of this specification may specifically be improvement of the accuracy of the obtained DPD coefficient.

DPD calibration performed when the standing wave of the antenna is poor lead to deterioration of radio frequency performance. If DPD calibration is performed again at regular intervals through the foregoing embodiment 100, the impact of DPD deterioration on radio frequency performance can be largely avoided. However, frequent DPD calibration degrades Wi-Fi performance. This is because a radio frequency link cannot perform normal communication during DPD calibration, and time resources occupied by DPD calibration reduce the throughput of Wi-Fi. For example, before digital pre-distortion calibration is performed in S104 of the foregoing embodiment, the following step may be further included: detecting a throughput of wireless network Wi-Fi of the electronic device. In this case, S104 of the foregoing embodiment may specifically be: obtaining the calibration result through digital pre-distortion calibration in a case that the standing wave status satisfies the preset working condition and the throughput of the Wi-Fi is less than a preset threshold.

In this embodiment, the throughput of the Wi-Fi is fully considered during DPD calibration, and DPD calibration is performed when the throughput of the Wi-Fi is less than the preset threshold, to minimize the impact of DPD calibration on Wi-Fi and improve Wi-Fi communication efficiency.

In practical applications, the electronic device may support Wi-Fi connection in a plurality of bands, that is, a radio frequency module of the electronic device has a plurality of Wi-Fi operating bands, and the obtaining the calibration result through digital pre-distortion calibration in a case that the standing wave status satisfies the preset working condition and the throughput of the Wi-Fi is less than a preset threshold in the foregoing embodiment includes:

in a case that the standing wave status satisfies the preset working condition and a throughput of a target band is less than the preset threshold, performing digital pre-distortion calibration on the target band to obtain the calibration result, and performing data transmission by using at least one Wi-Fi band other than the target band; where the target band is at least one band of the plurality of Wi-Fi operating bands.

In this embodiment, the throughput of the Wi-Fi is fully considered during DPD calibration, and DPD calibration is performed when the throughput of the Wi-Fi is less than the preset threshold, to minimize the impact of DPD calibration on Wi-Fi and improve Wi-Fi communication efficiency.

Figure 3:
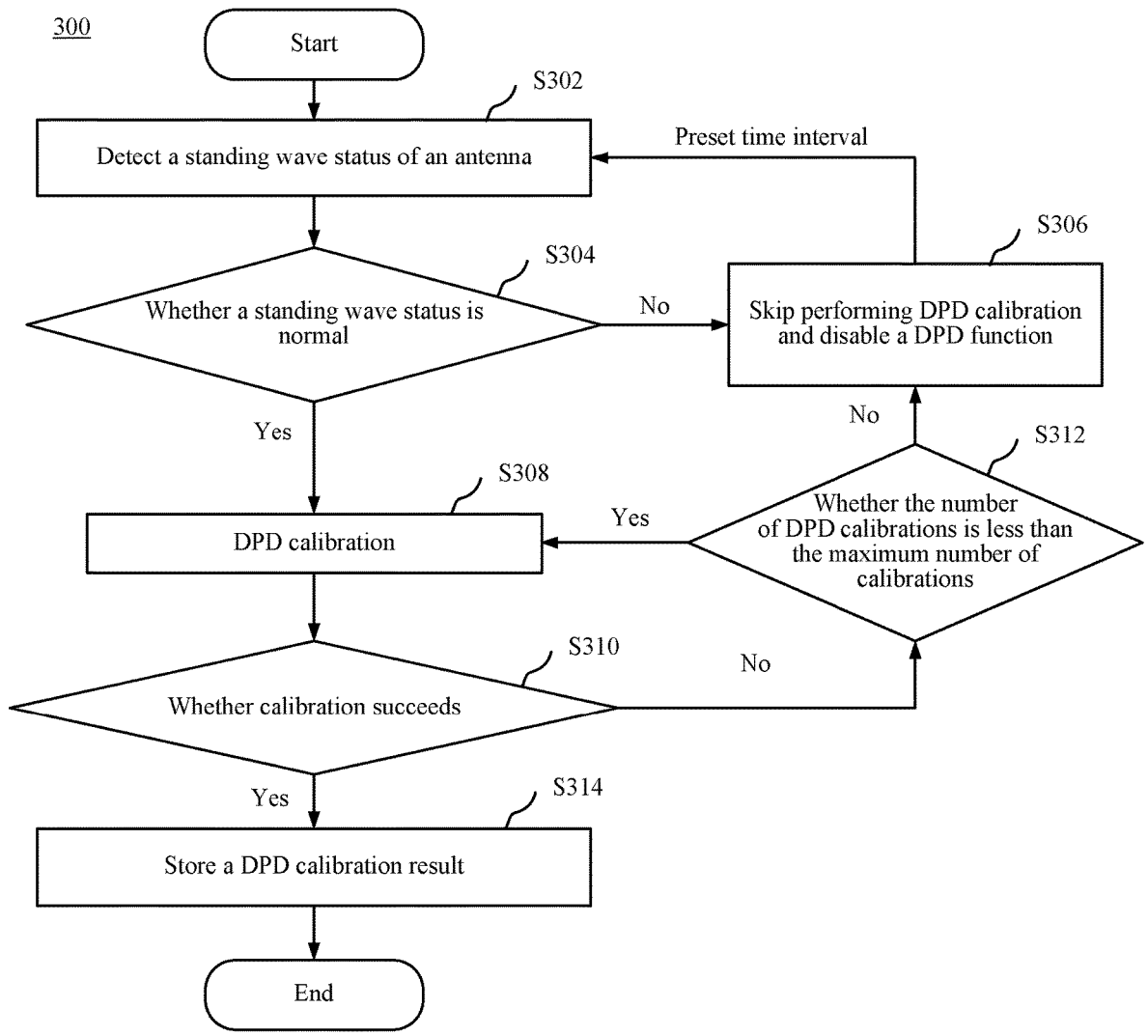
FIG. 3 is a schematic flowchart of a digital pre-distortion processing method according to another embodiment of the present disclosure.

To describe in detail the digital pre-distortion processing method provided in the embodiments of the present disclosure, several specific embodiments are described below. As shown in FIG. 3, the embodiment 300 includes the following steps:

S302: Detect a standing wave status of an antenna of an electronic device.

S304: Determine whether the standing wave status of the antenna is normal.

If yes, execute S308.

If not, execute S306.

S306: Skip performing DPD calibration and disable a DPD function.

S308: Perform DPD calibration.

S310: Determine whether DPD calibration succeeds.

If yes, execute S314.

If not, execute S312.

S312: Determine whether the number of DPD calibrations is less than the maximum number of calibrations.

If yes, execute S308.

If not, execute S306.

S314: Store a DPD calibration result.

The DPD calibration result includes a DPD coefficient. When a PA subsequently operates, a signal inputted to the PA can be pre-distorted according to the DPD coefficient, thereby ensuring the linearity of the PA and reducing the distortion of PA.

The embodiments of the present disclosure can avoid the problem of low DPD calibration accuracy caused because DPD calibration is performed when an antenna standing wave is poor, to improve the DPD calibration accuracy and reduce the distortion of the PA, improve the radio frequency performance, and facilitate the optimization of an EVM and an ACPR of the PA.

Figure 4:
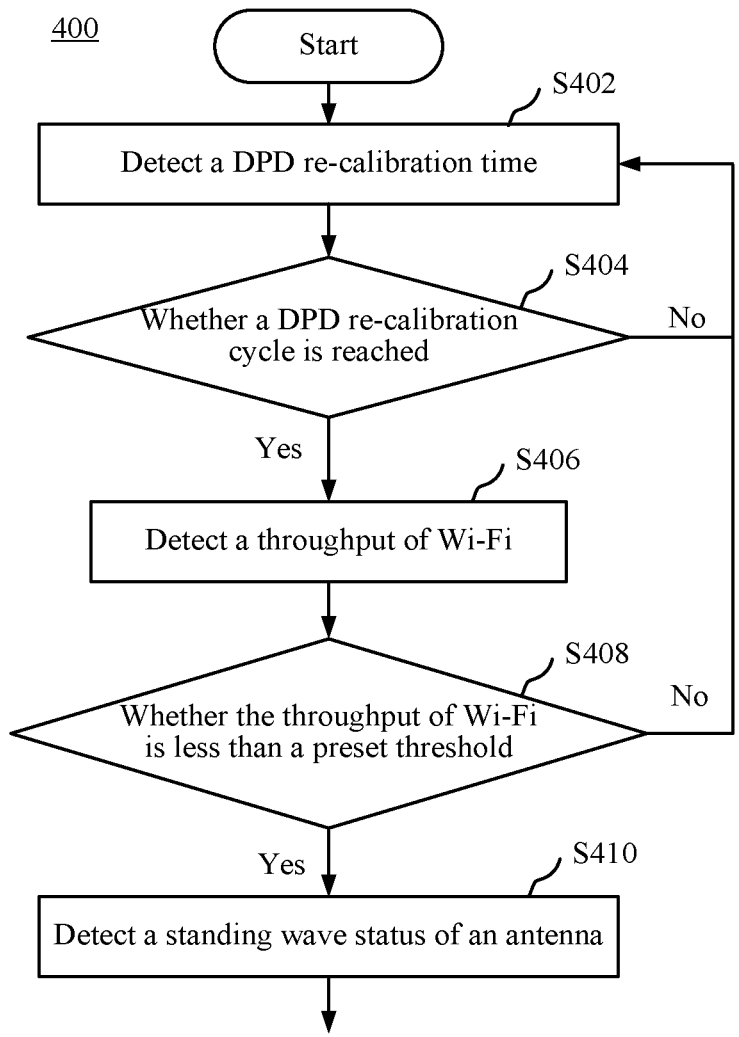
FIG. 4 is a schematic flowchart of a digital pre-distortion processing method according to still another embodiment of the present disclosure.

FIG. 4 is a digital pre-distortion processing method provided in another embodiment of the present disclosure. As shown in FIG. 4, this embodiment 400 includes the following steps:

S402: Detect a DPD re-calibration time.

S404: Determine whether a DPD re-calibration cycle is reached.

If yes, execute S406.

If not, continue to execute S402.

S406: Detect a throughput of Wi-Fi of the electronic device.

S408: Determine whether the throughput of Wi-Fi is less than a preset threshold.

If yes, execute S410.

If not, continue to execute S402.

S410: Detect a standing wave status of an antenna of the electronic device.

Subsequent steps in this embodiment may continue to be performed with reference to S304 to S314 in the foregoing embodiment. To avoid repetition, the description of the foregoing repeated steps are omitted herein.

The embodiments of the present disclosure can avoid the problem of low DPD calibration accuracy caused because DPD calibration is performed when an antenna standing wave is poor, to improve the DPD calibration accuracy and reduce the distortion of the PA, improve the radio frequency performance, and facilitate the optimization of an EVM and an ACPR of the PA.

In this embodiment, the throughput of the Wi-Fi is fully considered during DPD calibration, and DPD calibration is performed when the throughput of the Wi-Fi is less than the preset threshold, to minimize the impact of DPD calibration on Wi-Fi and improve Wi-Fi communication efficiency.

For example, in this embodiment, when the radio frequency module of the electronic device has a plurality of Wi-Fi operating bands (for example, when the electronic device can use 2.4G and 5G Wi-Fi at the same time), traffic usage statuses of 2.4G and 5G bands can be monitored simultaneously in the background. DPD re-calibration is performed on a band that does not use Wi-Fi traffic.

Figure 5:
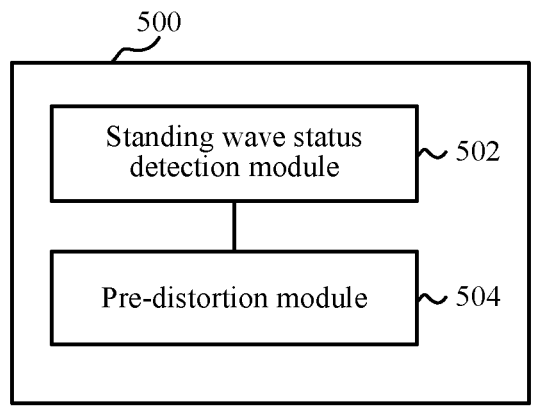
FIG. 5 is a schematic structural diagram of an electronic device according to an embodiment of the present disclosure.

The digital pre-distortion processing method according to the embodiments of the present disclosure is described in detail above with reference to FIG. 1 to FIG. 4. The electronic device according to the embodiments of the present disclosure will be described in detail below with reference to FIG. 5. FIG. 5 is a schematic structural diagram of an electronic device according to an embodiment of the present disclosure. As shown in FIG. 5, the electronic device 500 includes:

a standing wave status detection module 502, configured to detect a standing wave status of an antenna of the electronic device; and a pre-distortion module 504, configured to: obtain a calibration result through digital pre-distortion calibration in a case that the standing wave status satisfies a preset working condition; where the pre-distortion module 504 may be further configured to determine whether to enable a digital pre-distortion function according to the calibration result.

In the embodiments of the present disclosure, the standing wave status of the antenna is detected, in the case that the standing wave status satisfies the preset working condition, the calibration result is obtained through digital pre-distortion calibration, and whether to enable the digital pre-distortion function is determined according to the calibration result. The embodiments of the present disclosure can avoid the problem of low DPD calibration accuracy caused because DPD calibration is performed when an antenna standing wave is poor, to improve the DPD calibration accuracy and reduce the distortion of the PA.

For example, as an embodiment, the electronic device 500 further includes: a throughput detection module, configured to detect a throughput of Wi-Fi of the electronic device; and the pre-distortion module 504 is configured to: obtain the calibration result through digital pre-distortion calibration in a case that the standing wave status satisfies the preset working condition and the throughput of the Wi-Fi is less than a first threshold.

For example, as an embodiment, a radio frequency module of the terminal device has a plurality of Wi-Fi operating bands, and the pre-distortion module 504 is configured to:

in a case that the standing wave status satisfies the preset working condition and a throughput of a target band is less than the first threshold,
perform digital pre-distortion calibration on the target band to obtain the calibration result, and perform data transmission by using at least one Wi-Fi band other than the target band; where
the target band is at least one band of the plurality of Wi-Fi operating bands.

For example, as an embodiment, the pre-distortion module 504 is configured to:

in a case that digital pre-distortion calibration succeeds, enable the digital pre-distortion function; and in a case that digital pre-distortion calibration fails, perform digital pre-distortion calibration again.

For example, as an embodiment, the standing wave status detection module 502 is configured to: detect an offset between a feedback power of a power amplifier of the electronic device and a feedback power of the antenna; and in a case that the offset is less than or equal to a second threshold, determine that the standing wave status satisfies the preset working condition.

For the electronic device according to this embodiment of the present disclosure, refer to the corresponding procedure of the digital pre-distortion processing method according to an embodiment of the present disclosure, and each unit/module in and the foregoing other operations and/or functions of the electronic device are used to implement the corresponding procedure of the digital pre-distortion processing method, and will no longer be described herein for the purpose of brevity.

Figure 6:
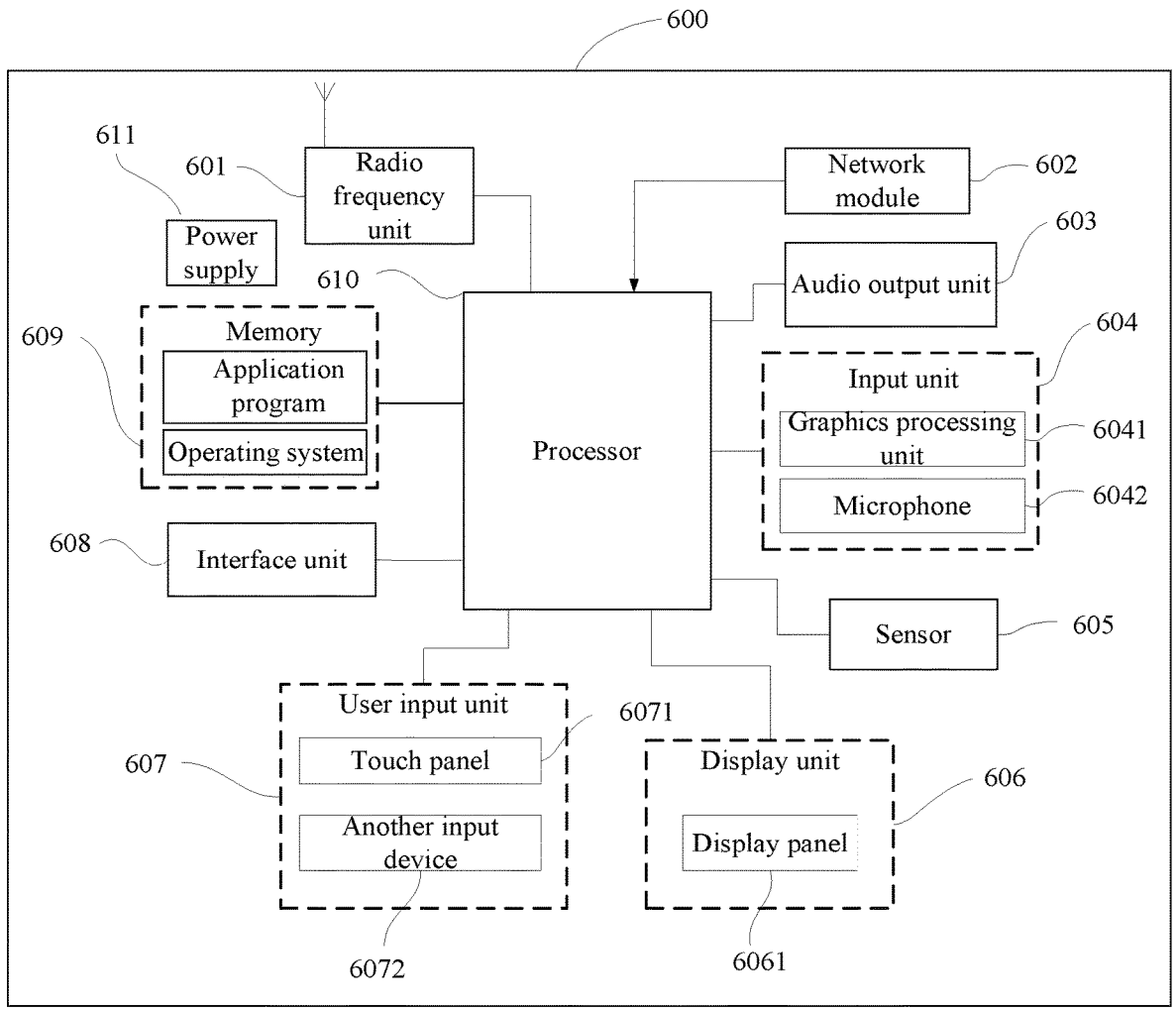
FIG. 6 is a schematic diagram of a hardware structure of an electronic device for implementing embodiments of the present disclosure.

FIG. 6 is a schematic structural diagram of hardware of an electronic device implementing the embodiments of the present disclosure. The electronic device 600 includes but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and other components. A person skilled in the art may understand that the structure of the electronic device shown in FIG. 6 constitutes no limitation on the electronic device. The electronic device may include more or fewer components than those shown in the figure, or a combination of some components, or an arrangement of different components. In this embodiment of the present disclosure, the electronic device includes but is not limited to a mobile phone, a tablet computer, a notebook computer, a palmtop computer, an in-vehicle terminal, a wearable device, a pedometer, and the like.

The processor 610 is configured to: detect a standing wave status of an antenna of the electronic device; obtain a calibration result through digital pre-distortion calibration in a case that the standing wave status satisfies a preset working condition; and determine whether to enable a digital pre-distortion function according to the calibration result.

In the embodiments of the present disclosure, the standing wave status of the antenna of the electronic device is detected, in the case that the standing wave status satisfies the preset working condition, the calibration result is obtained through digital pre-distortion calibration, and whether to enable the digital pre-distortion function is determined according to the calibration result. The embodiments of the present disclosure can avoid the problem of low DPD calibration accuracy caused because DPD calibration is performed when an antenna standing wave is poor, to improve the DPD calibration accuracy and reduce the distortion of the PA.

It should be understood that in this embodiment of the present disclosure, the radio frequency unit 601 may be configured to receive and transmit information, or receive and transmit signals during a call. Specifically, the radio frequency unit receives downlink data from a base station, and transmits the downlink data to the processor 610 for processing; and transmits uplink data to the base station. Generally, the radio frequency unit 601 includes, but is not limited to, an antenna, at least one amplifier, a transceiver, a coupler, a low noise amplifier, and a duplexer. In addition, the radio frequency unit 601 may also communicate with a network and other devices through a wireless communication system.

The electronic device provides users with wireless broadband Internet access through the network module 602, for example, helps users receive and send e-mails, browse web pages, and access streaming media.

The audio output unit 603 may convert audio data received by the radio frequency unit 601 or the network module 602 or stored in the memory 609 into an audio signal and output the audio signal as a sound. Moreover, the audio output unit 603 can further provide audio output related to a specific function performed the electronic device 600 (for example, call signal receiving sound and message receiving sound). The audio output unit 603 includes a speaker, a buzzer, a telephone receiver, and the like.

The input unit 604 is configured to receive audio or radio frequency signals. The input unit 604 may include a Graphics Processing Unit (GPU) 6041 and a microphone 6042, and the graphics processing unit 6041 processes image data of a still picture or video obtained by an image capture device (such as a camera) in a video capture mode or an image capture mode. A processed image frame may be displayed on the display unit 606. The image frame processed by the graphics processing unit 6041 may be stored in the memory 609 (or another storage medium) or sent by using the radio frequency unit 601 or the network module 602. The microphone 6042 may receive sound and can process such sound into audio data. The audio data obtained through processing may be converted, in a telephone call mode, into a format that may be sent to a mobile communication base station via the radio frequency unit 601 for output.

The electronic device 600 further includes at least one sensor 605, for example, a light sensor, a motion sensor, and another sensor. Specifically, the light sensor includes an ambient light sensor and a proximity sensor. The ambient light sensor may adjust brightness of a display panel 6061 according to ambient light brightness. The proximity sensor may switch off the display panel 6061 and/or backlight when the electronic device 600 moves close to an ear. As a motion sensor, an accelerometer sensor may detect magnitude of acceleration in various directions (usually three axes), may detect magnitude and the direction of gravity when stationary, may be configured to identify electronic device postures (such as switching between a landscape mode and a portrait mode, related games, and magnetometer posture calibration), may perform functions related to vibration identification (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, or the like. Details are not described herein again.

The display unit 606 is configured to display information entered by the user or information provided for the user. The display unit 606 may include a display panel 6061, and the display panel 6061 may be configured in a form of a Liquid Crystal Display (LCD), an Organic Light-Emitting Diode (OLED), or the like.

The user input unit 607 may be configured to receive entered number or character information, and generate key signal input related to user settings and function control of the electronic device. Specifically, the user input unit 607 includes a touch panel 6071 and another input device 6072. The touch panel 6071, also called a touch screen, can collect a touch operation of the user on or near the touch panel 6071 (for example, an operation performed by the user with any suitable object or accessory such as a finger or a stylus on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, and sends the contact coordinates to the processor 610, and can receive and execute a command sent by the processor 610. In addition, the touch panel 6071 may be implemented by various types such as a resistive type, a capacitive type, an infrared ray type or a surface acoustic wave type. In addition to the touch panel 6071, the user input unit 607 may further include another input device 6072. Specifically, the another input device 6072 may include but is not limited to: a physical keyboard, a function key (such as a volume control key, a switch key), a trackball, a mouse, and a joystick, which is no longer repeated here.

Further, the touch panel 6071 may cover the display panel 6061. When detecting a touch operation on or near the touch panel 6071, the touch panel 6071 transmits the touch operation to the processor 610 to determine a type of a touch event. Then, the processor 610 provides corresponding visual output on the display panel 6061 based on the type of the touch event. Although in FIG. 6, the touch panel 6071 and the display panel 6061 are configured as two independent components to implement input and output functions of the electronic device, in some embodiments, the touch panel 6071 and the display panel 6061 can be integrated to implement the input and output functions of the electronic device. Details are not limited herein.

The interface unit 608 is an interface for connecting an external apparatus and the electronic device 600. For example, the external apparatus may include a wired or wireless headset jack, an external power supply (or a battery charger) port, a wired or wireless data port, a storage card port, a port for connecting an apparatus having an identification module, an audio Input/Output (I/O) port, a video I/O port, a headset jack, or the like. The interface unit 608 can be configured to receive input from an external apparatus (for example, data information and power) and transmit the received input to one or more elements in the electronic device 600, or can be configured to transmit data between the electronic device 600 and the external apparatus.

The memory 609 may be configured to store a software program and various data. The memory 609 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 609 may include a high-speed random access memory or a nonvolatile memory, for example, at least one disk storage device, a flash memory, or other volatile solid-state storage devices.

The processor 610 is a control center of the electronic device and connects all parts of the electronic device using various interfaces and circuits. By running or executing software programs and/or modules stored in the memory

609 and by calling data stored in the memory 609, the processor 610 implements various functions of the electronic device and processes data, thus performing overall monitoring on the electronic device. The processor 610 may include one or more processing units. In some embodiments, the processor 610 may integrate an application processor and a modem processor. The application processor mainly deals with an operating system, a user interface, an application, and the like. The modem processor mainly deals with wireless communication. It may be understood that the modem processor may not be integrated into the processor 610.

The electronic device 600 may further include the power supply 611 (such as a battery) supplying power to each component. Preferably, the power supply 611 may be logically connected to the processor 610 by using a power management system, so as to implement functions such as charging management, discharging management and power consumption management by using the power management system.

In addition, the electronic device 600 includes some functional modules not shown. Details are not described herein again.

Preferably, an embodiment of the present disclosure further provides an electronic device, including a processor 610, a memory 609, and a computer program stored in the memory 609 and executable on the processor 610. When the processor 610 executes the computer program, the foregoing processes of the method embodiments 100 to 400 are implemented and a same technical effect can be achieved. To avoid repetition, details are not described herein again.

An embodiment of the present disclosure further provides a computer readable storage medium. The computer readable storage medium stores a computer program. When the computer program is executed by a processor, the foregoing processes of the method embodiments 100 to 400 are implemented, and a same technical effect can be achieved. To avoid repetition, details are not described herein again. The computer-readable storage medium may be a Read-Only Memory (ROM), a Random Access Memory (RAM), a magnetic disk, a compact disc, or the like.

An embodiment of the present disclosure further provides a computer program product. The computer program product is stored in a nonvolatile storage medium. The program product is configured to be executed by at least one processor to implement the foregoing processes of the method embodiments 100 to 400, and a same technical effect can be achieved. To avoid repetition, details are not described herein again.

An embodiment of the present disclosure further provides a chip, where the chip includes a processor and a communication interface, the communication interface is coupled to the processor, and the processor is configured to run a program or an instruction to implement the foregoing processes of the method embodiments 100 to 400, and a same technical effect can be achieved. To avoid repetition, details are not described herein again.

An embodiment of the present disclosure further provides a digital pre-distortion processing apparatus. The digital pre-distortion processing apparatus is configured to implement the foregoing processes of the method embodiments 100 to 400, and a same technical effect can be achieved. To avoid repetition, details are not described herein again.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. Without more restrictions, an element defined by the statement "including a . . . " does not exclude another same element in this process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations, and the foregoing specific implementations are only illustrative and not restrictive. Under the enlightenment of the present disclosure, a person of ordinary skill in the art can make many forms without departing from the purpose of the present disclosure and the protection scope of the claims, and all of these fall within the protection of the present disclosure.

The invention claimed is:

1. A method of digital pre-distortion processing, performed by an electronic device, the method comprising:
   detecting a standing wave status of an antenna of the electronic device;
   detecting a throughput of wireless network Wi-Fi of the electronic device;
   when the standing wave status satisfies a preset working condition and the throughput of the Wi-Fi is less than a first threshold, obtaining a calibration result through digital pre-distortion calibration; and
   determining whether to enable a digital pre-distortion function according to the calibration result.

2. The method according to claim 1, wherein a radio frequency module of the electronic device has a plurality of Wi-Fi operating bands, and when the standing wave status satisfies a preset working condition and the throughput of the Wi-Fi is less than a first threshold, the obtaining the calibration result through digital pre-distortion calibration comprises:
   when the standing wave status satisfies the preset working condition and a throughput of a target band is less than the first threshold,
   performing digital pre-distortion calibration on the target band to obtain the calibration result, and performing data transmission by using at least one Wi-Fi band other than the target band; wherein
   the target band is at least one band of the plurality of Wi-Fi operating bands.

3. The method according to claim 1, wherein the determining whether to enable a digital pre-distortion function according to the calibration result comprises:
   in a case that digital pre-distortion calibration succeeds, enabling the digital pre-distortion function; and in a case that digital pre-distortion calibration fails, performing digital pre-distortion calibration again.

4. The method according to claim 1, wherein the detecting a standing wave status of an antenna of the electronic device comprises:
   detecting an offset between a feedback power of a power amplifier of the electronic device and a feedback power of the antenna; and
   in a case that the offset is less than or equal to a second threshold, determining that the standing wave status satisfies the preset working condition.

5. An electronic device, comprising:
   a memory storing computer-readable instructions; and
   a processor coupled to the memory and configured to execute the computer-readable instructions, wherein the computer-readable instructions, when executed by the processor, cause the processor to perform operations comprising:
   detecting a standing wave status of an antenna of the electronic device;
   detecting a throughput of wireless network Wi-Fi of the electronic device;
   when the standing wave status satisfies a preset working condition and the throughput of the Wi-Fi is less than a first threshold,
   obtaining a calibration result through digital pre-distortion calibration; and
   determining whether to enable a digital pre-distortion function according to the calibration result.

6. The electronic device according to claim 5, comprising a radio frequency module having a plurality of Wi-Fi operating bands, wherein when the standing wave status satisfies a preset working condition and the throughput of the Wi-Fi is less than a first threshold, the obtaining the calibration result through digital pre-distortion calibration comprises:
   in a case that when the standing wave status satisfies the preset working condition and a throughput of a target band is less than the first threshold,
   performing digital pre-distortion calibration on the target band to obtain the calibration result, and performing data transmission by using at least one Wi-Fi band other than the target band; wherein
   the target band is at least one band of the plurality of Wi-Fi operating bands.

7. The electronic device according to claim 5, wherein the determining whether to enable a digital pre-distortion function according to the calibration result comprises:
   in a case that digital pre-distortion calibration succeeds, enabling the digital pre-distortion function; and
   in a case that digital pre-distortion calibration fails, performing digital pre-distortion calibration again.

8. The electronic device according to claim 5, wherein the detecting a standing wave status of an antenna of the electronic device comprises:
   detecting an offset between a feedback power of a power amplifier of the electronic device and a feedback power of the antenna; and
   in a case that the offset is less than or equal to a second threshold, determining that the standing wave status satisfies the preset working condition.

9. A non-transitory computer-readable medium storing instructions that, when executed by a processor, cause the processor to perform a method of digital pre-distortion processing, wherein the method comprises:
   detecting a standing wave status of an antenna of an electronic device;
   detecting a throughput of wireless network Wi-Fi of the electronic device;
   when the standing wave status satisfies a preset working condition and the throughput of the Wi-Fi is less than a first threshold,
   obtaining a calibration result through digital pre-distortion calibration; and
   determining whether to enable a digital pre-distortion function according to the calibration result.

10. The non-transitory computer-readable medium according to claim 9, wherein a radio frequency module of the electronic device has a plurality of Wi-Fi operating bands, and when the standing wave status satisfies a preset working condition and the throughput of the Wi-Fi is less than a first threshold, the obtaining the calibration result through digital pre-distortion calibration comprises:
   when the standing wave status satisfies the preset working condition and a throughput of a target band is less than the first threshold,
   performing digital pre-distortion calibration on the target band to obtain the calibration result, and performing data transmission by using at least one Wi-Fi band other than the target band; wherein
   the target band is at least one band of the plurality of Wi-Fi operating bands.

11. The non-transitory computer-readable medium according to claim 9, wherein the determining whether to enable a digital pre-distortion function according to the calibration result comprises:
   in a case that digital pre-distortion calibration succeeds, enabling the digital pre-distortion function; and
   in a case that digital pre-distortion calibration fails, performing digital pre-distortion calibration again.

12. The non-transitory computer-readable medium according to claim 9, wherein the detecting a standing wave status of an antenna of the electronic device comprises:
   detecting an offset between a feedback power of a power amplifier of the electronic device and a feedback power of the antenna; and
   in a case that the offset is less than or equal to a second threshold, determining that the standing wave status satisfies the preset working condition.

* * * * *